US012625739B2

(12) United States Patent (10) Patent No.: US 12,625,739 B2

Lotz et al. (45) Date of Patent: May 12, 2026

(54) AUTOMATED NESTING OF EXISTING STACKS IN A ROOT STACK WITHIN AN AWS ENVIRONMENT

(71) Applicants: Michael Glen Lotz, Longmont, CO (US); Benjamin Beatty, Boulder, CO (US); Marquis G. Waller, Beverly, OH (US)

(72) Inventors: Michael Glen Lotz, Longmont, CO (US); Benjamin Beatty, Boulder, CO (US); Marquis G. Waller, Beverly, OH (US)

(73) Assignee: Ricoh Company, Ltd., Tokyo (JP)

(\*) Notice: Subject to any disclaimer, the term of this patent is extended or adjusted under 35 U.S.C. 154(b) by 619 days.

(21) Appl. No.: 17/689,884

(22) Filed: Mar. 8, 2022

(65) Prior Publication Data

US 2023/0289237 A1 Sep. 14, 2023

(51) Int. Cl.
*G06F 3/00* (2006.01)
*G06F 9/50* (2006.01)
(52) U.S. Cl.
CPC .................................. *G06F 9/5077* (2013.01)
(58) Field of Classification Search
CPC ........................................................ G06F 9/48
See application file for complete search history.

(56) References Cited

U.S. PATENT DOCUMENTS

| | | | |
|---|---|---|---|
| 8,825,817 B1 | 9/2014 | Jaisinghani et al. | |
| 9,058,219 B2 | 6/2015 | Jaisinghani et al. | |
| 9,553,918 B1 * | 1/2017 | Manion ................... | G06F 16/40 |
| 9,672,114 B2 * | 6/2017 | Cáliz ....................... | G06F 11/14 |
| 10,225,335 B2 | 3/2019 | Fu et al. | |
| 10,387,271 B2 * | 8/2019 | Mosek ................ | G06F 11/1451 |
| 10,775,976 B1 * | 9/2020 | Abdul-Jawad ........... | G06F 9/54 |
| 10,860,676 B2 * | 12/2020 | Romanenko .......... | G06F 3/0482 |
| 10,990,306 B1 * | 4/2021 | Aggarwal ............. | G06F 3/0659 |
| 11,086,685 B1 | 8/2021 | Koppes et al. | |
| 11,418,555 B1 * | 8/2022 | Cafaro .................. | H04L 65/612 |
| 2009/0276771 A1 * | 11/2009 | Nickolov ............ | H04L 67/1029 |
| | | | 718/1 |

(Continued)

FOREIGN PATENT DOCUMENTS

| | | | | |
|---|---|---|---|---|
| CN | 109347663 A | 2/2019 | | |
| WO | WO-2020131388 A1 * | 6/2020 | ............. | G06F 30/12 |

OTHER PUBLICATIONS

Nathan Chong, Code-level model checking in the software development workflow at Amazon Web Services. (Year: 2021).*

(Continued)

*Primary Examiner* — Lechi Truong
(74) *Attorney, Agent, or Firm* — Duft & Bornsen, PC

(57) ABSTRACT

System, method, and software of moving existing stacks in an AWS environment into a root stack. In one embodiment, a stack nesting system obtains a root template that describes a root stack in the AWS environment, identifies a nested stack existing in the AWS environment that is referenced in the root template, interacts with an AWS provisioning service (e.g., AWS CloudFormation) to update the nested stack to preclude default values assigned to parameters of the nested stack, and interacts with the AWS provisioning service to import the nested stack within the root stack in the AWS environment.

20 Claims, 16 Drawing Sheets

(56)            References Cited

U.S. PATENT DOCUMENTS

| | | | |
|---|---|---|---|
| 2013/0311875 A1* | 11/2013 | Pappas .................. | G06F 40/143 |
| | | | 715/234 |
| 2016/0004711 A1* | 1/2016 | Soon-Shiong ......... | G06Q 30/02 |
| | | | 715/205 |
| 2017/0006119 A1* | 1/2017 | Pogrebinsky ......... | G06F 3/0482 |
| 2018/0196867 A1 | 7/2018 | Wiesmaier et al. | |
| 2018/0205600 A1* | 7/2018 | Burton ................ | H04L 67/1097 |
| 2019/0007526 A1 | 1/2019 | Kramer et al. | |
| 2019/0121869 A1* | 4/2019 | Braunstein .............. | H04L 67/02 |
| 2019/0251280 A1* | 8/2019 | Singh ........................ | G06F 7/58 |
| 2019/0294477 A1 | 9/2019 | Koppes et al. | |
| 2020/0184394 A1 | 6/2020 | Delacourt et al. | |
| 2020/0193700 A1* | 6/2020 | Vandenbrouck ........ | G06F 30/12 |
| 2020/0334241 A1* | 10/2020 | Muralidhar ........... | G06F 3/0644 |
| 2021/0049226 A1* | 2/2021 | Zheng ................. | G06F 16/9566 |
| 2021/0240911 A1* | 8/2021 | Kucherov .............. | G06F 3/061 |
| 2022/0058449 A1* | 2/2022 | Goodsitt .................. | G06N 5/01 |
| 2022/0292147 A1* | 9/2022 | Keyser ................. | G06F 16/958 |
| 2022/0342981 A1* | 10/2022 | Wing .................... | G06F 21/606 |
| 2023/0388578 A1* | 11/2023 | Brockmann ..... | H04N 21/47217 |

OTHER PUBLICATIONS

Mwaura Gerald, Design and Implementation of OpenStack Hack-Lab. (Year: 2018).*

Keith R. Jackson, Performance and cost analysis of the Supernova factory on the Amazon AWS cloud. (Year: 2011).*

Zhixiong Niu, Network Stack as a Service in the Cloud. (Year: 2017).*

AWS Whitepaper; Overview of Deployment Options on AWS; Amazon Web Services Inc.

Moving Resources Between Stacks; AWS CloudFormation; https://docs.aws.amazon.com/AWSCloudFormation/latest/UserGuide/refactor-stacks.

Updating Stacks Directly; https://docs.aws.amazon.com/AWSCloudFormation/latest/UserGuide/using-cfn-updating-stacks-direct.

Working with Stacks; https://docs.aws.amazon.com/AWSCloudFormation/latest/UserGuide/stacks.

* cited by examiner

*FIG. 2*

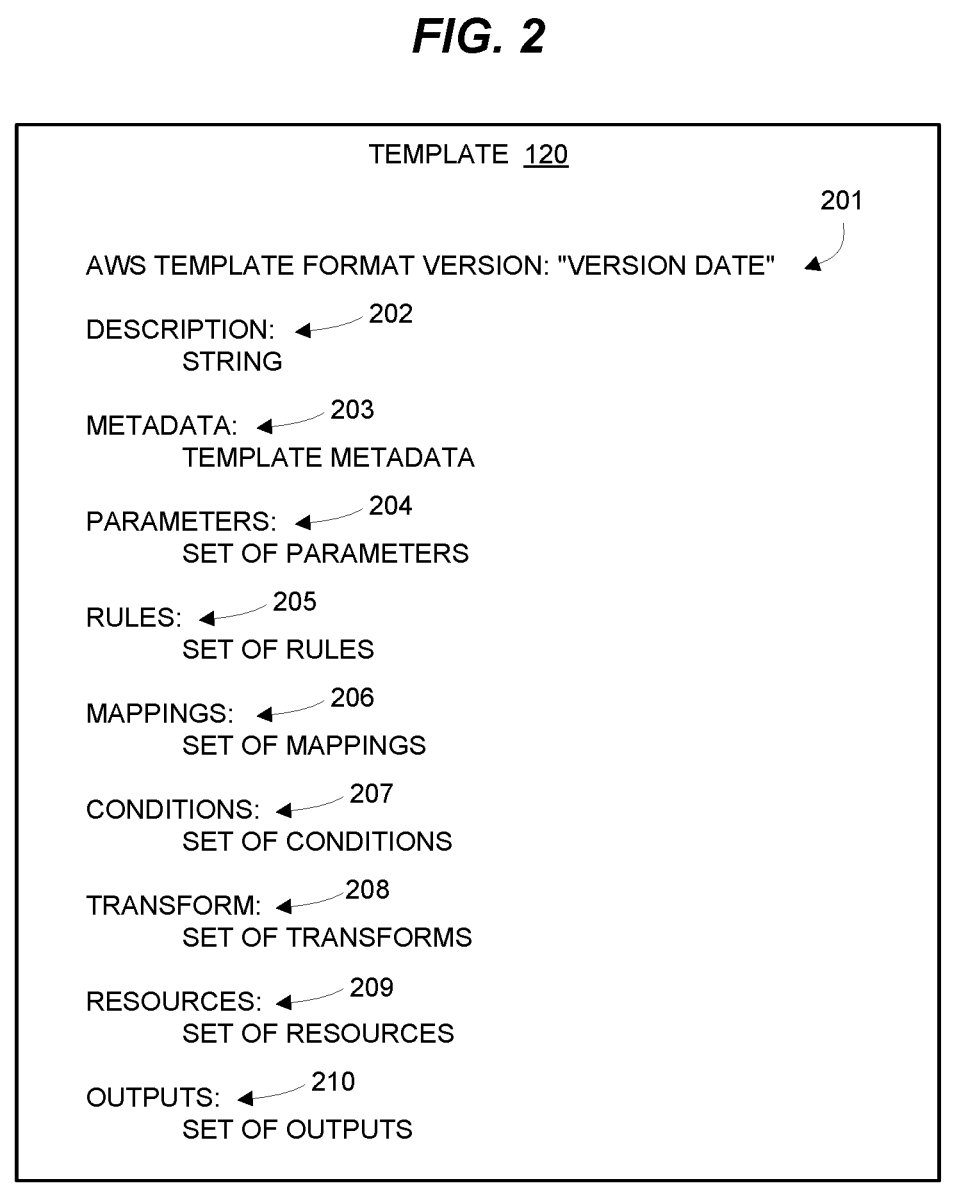

TEMPLATE 120

AWS TEMPLATE FORMAT VERSION: "VERSION DATE" ◄ 201

DESCRIPTION: ◄ 202
        STRING

METADATA: ◄ 203
        TEMPLATE METADATA

PARAMETERS: ◄ 204
        SET OF PARAMETERS

RULES: ◄ 205
        SET OF RULES

MAPPINGS: ◄ 206
        SET OF MAPPINGS

CONDITIONS: ◄ 207
        SET OF CONDITIONS

TRANSFORM: ◄ 208
        SET OF TRANSFORMS

RESOURCES: ◄ 209
        SET OF RESOURCES

OUTPUTS: ◄ 210
        SET OF OUTPUTS

700

OBTAIN A ROOT TEMPLATE THAT
DESCRIBES A ROOT STACK                    702

IDENTIFY NESTED STACKS REFERENCED
IN THE ROOT TEMPLATE                      704

UPDATE THE NESTED STACKS TO
PRECLUDE DEFAULT VALUES ASSIGNED          706
TO PARAMETERS

IMPORT THE UPDATED NESTED STACKS          708
WITHIN THE ROOT STACK

FIG. 8

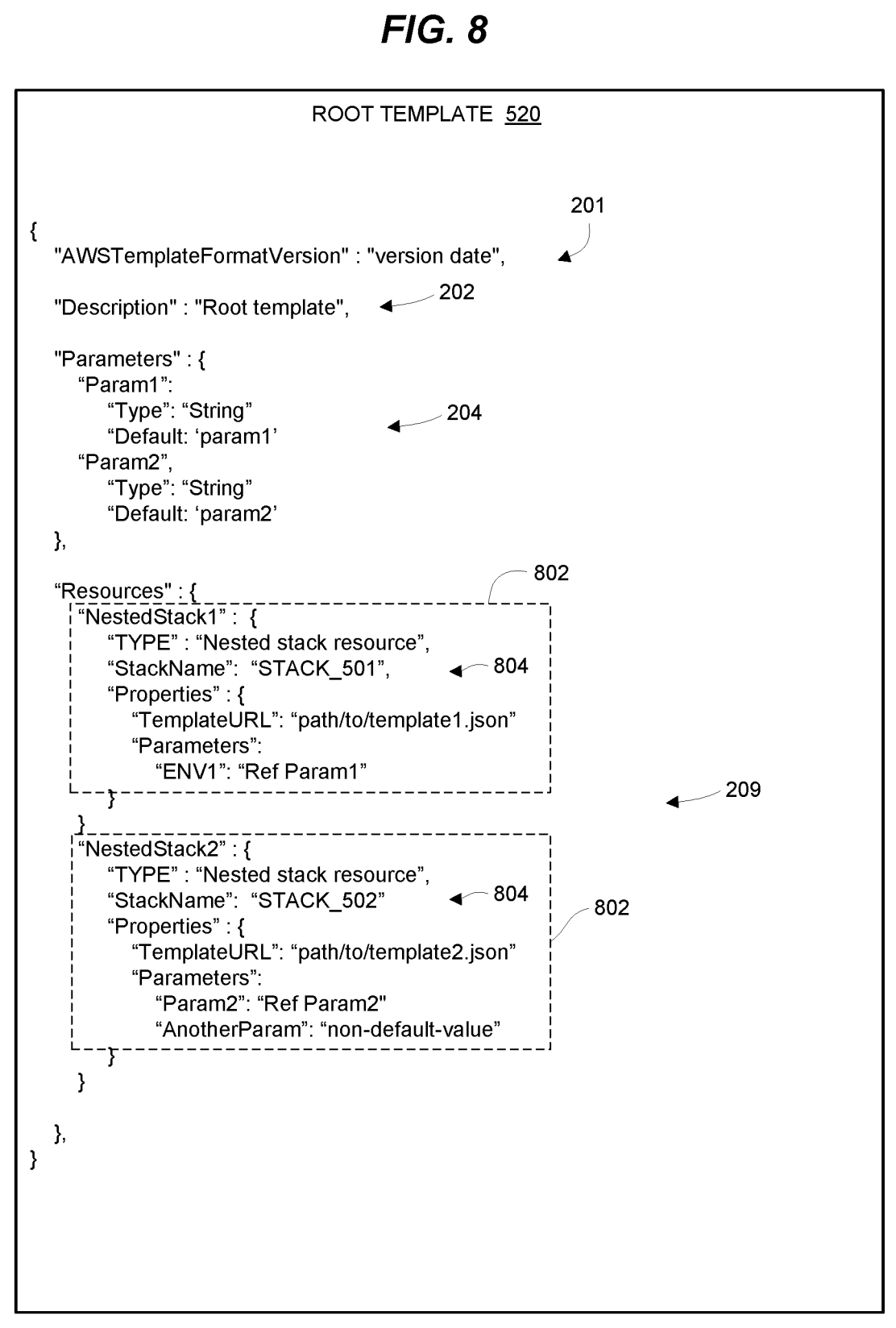

ROOT TEMPLATE 520

```
{
   "AWSTemplateFormatVersion" : "version date",          ◄  201

"Description" : "Root template",          ◄  202

"Parameters" : {
      "Param1":
         "Type": "String"          ◄  204
         "Default: 'param1'
      "Param2",
         "Type": "String"
         "Default: 'param2'
   }, "Resources" : {          802
      "NestedStack1" : {
         "TYPE" : "Nested stack resource",
         "StackName": "STACK_501",          ◄  804
         "Properties" : {
            "TemplateURL": "path/to/template1.json"
            "Parameters":
               "ENV1": "Ref Param1"
      }                                          ◄  209
   }
      "NestedStack2" : {
         "TYPE" : "Nested stack resource",
         "StackName": "STACK_502"          ◄  804
         "Properties" : {          802
            "TemplateURL": "path/to/template2.json"
            "Parameters":
               "Param2": "Ref Param2"
               "AnotherParam": "non-default-value"
      }
   }

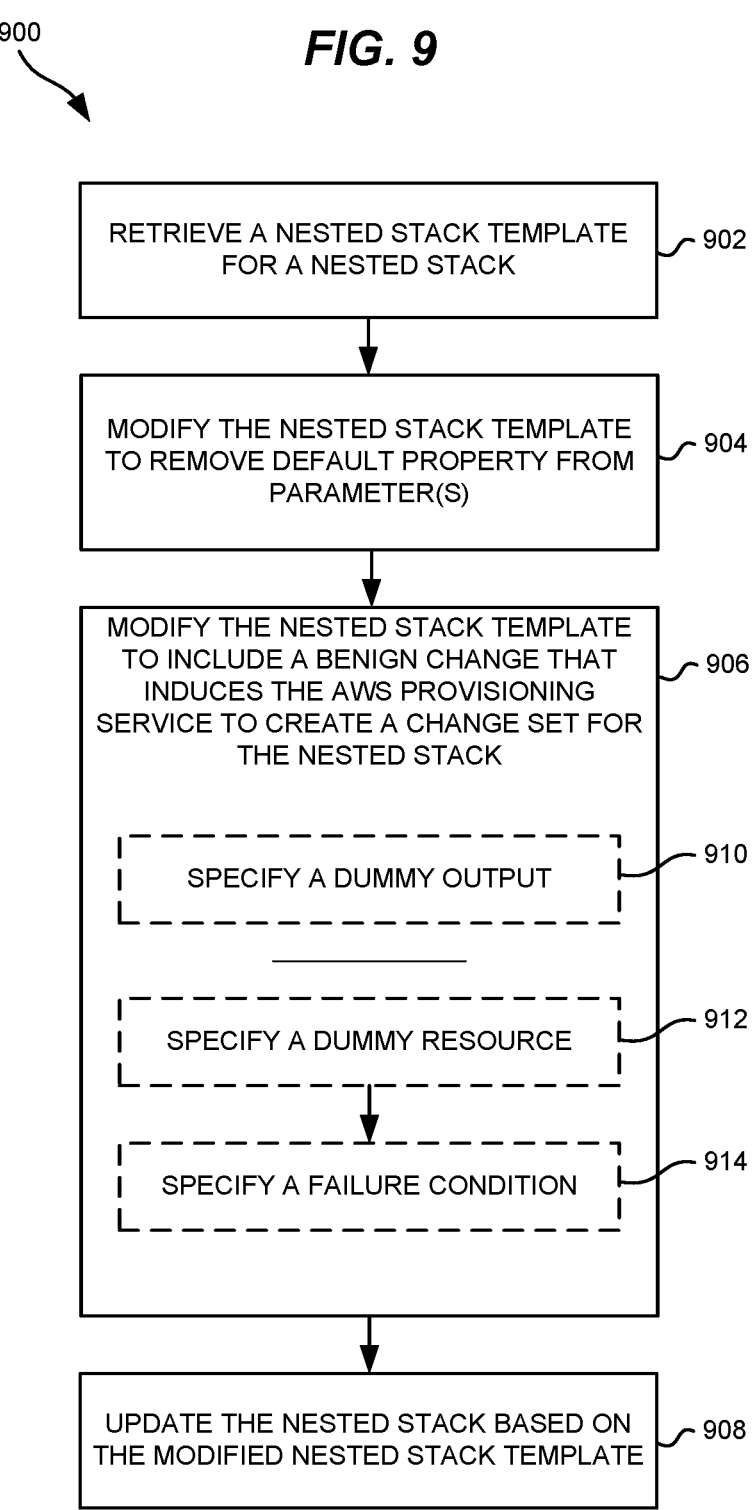

RETRIEVE A NESTED STACK TEMPLATE FOR A NESTED STACK ⟋ 902

MODIFY THE NESTED STACK TEMPLATE TO REMOVE DEFAULT PROPERTY FROM PARAMETER(S) ⟋ 904

MODIFY THE NESTED STACK TEMPLATE TO INCLUDE A BENIGN CHANGE THAT INDUCES THE AWS PROVISIONING SERVICE TO CREATE A CHANGE SET FOR THE NESTED STACK ⟋ 906

SPECIFY A DUMMY OUTPUT ⟋ 910

SPECIFY A DUMMY RESOURCE ⟋ 912

SPECIFY A FAILURE CONDITION ⟋ 914

UPDATE THE NESTED STACK BASED ON THE MODIFIED NESTED STACK TEMPLATE ⟋ 908

FIG. 10

NESTED STACK TEMPLATE 1020

```
{
    "AWSTemplateFormatVersion" : "version date",                201

"Description" : "STACK_501",           202

"Metadata" : {
        template metadata          203
    },

"Parameters" : {                          1002
    ┌ ─ ─ ─ ─ ─ ─ ─ ─ ─ ─ ─ ─ ─ ─ ─ ─ ─ ─ ─ ┐
    │   "ParameterC" : {                      │
    │       "Type" : "String",                │        204
    │       "Default" : "Default value"       │
    └ ─ ─ } ─ ─ ─ ─ ─ ─ ─ ─ ─ ─ ─ ─ ─ ─ ─ ─ ─┘
    },                                  1004

"Resources" : {
        "ResourceM" : {
            "TYPE" : "Resource type",
            "Properties" : {
                Set of properties                  209
            }
        }
        "ResourceN" : {
            "TYPE" : "Resource type",
            "Properties" : {
                Set of properties
            }
        }

MODIFIED NESTED STACK TEMPLATE  <u>1120</u>

```
{                                                              201
    "AWSTemplateFormatVersion" : "version date", "Description" : "STACK_501",          ← 202

"Metadata" : {                 ← 203
        template metadata
    },                                         ⌐1002
    "Parameters" : {                                        ← 204
        "ParameterC" : {
            "Type" : "String",
        }
    }, "Resources" : {
        "ResourceM" : {
            "TYPE" : "Resource type",
            "Properties" : {
                Set of properties
            }                                     ← 209
        }
        "ResourceN" : {
            "TYPE" : "Resource type",
            "Properties" : {
                Set of properties
            }
        }
    },                                         ⌐1112
    "Outputs" : {
        "DummyOutput" : {
            "Description" : "No value output",        ← 1110
            "Value" : "None"
        }
    }
}
```

FIG. 12

MODIFIED NESTED STACK TEMPLATE  <u>1120</u>

```
{
    "AWSTemplateFormatVersion" : "version date",          ← 201

"Description" : "STACK_501",          ← 202

"Metadata" : {          ← 203
        template metadata
    },
    "Parameters" : {          ← 1002
        "ParameterC" : {          ← 204
            "Type" : "String",
        }
    },
    "Conditions" : {          ← 1204
        "ForceDoNothing" : {          ← 207
            "Fn::Equals": ["true", "false"]
        }
    }, "Resources" : {
        "ResourceM" : {
            "TYPE" : "Resource type",
            "Properties" : {
                Set of properties          ← 209
            }
        }
        "ResourceN" : {
            "TYPE" : "Resource type",
            "Properties" : {
                Set of properties
            }
        }
        "DummyResource" : {          ← 1212
            "TYPE" : "Dummy_Resource",
            "Condition": "ForceDoNothing",          ← 1110
            "Properties" : {
                Set of properties
            }
        }
    },

}
```

1300

GENERATE A TEMPORARY ROOT
TEMPLATE FOR THE ROOT STACK — 1302

UPDATE THE ROOT STACK IN THE AWS
ENVIRONMENT BASED ON THE
TEMPORARY ROOT TEMPLATE — 1304

RUN A CHANGE SET COMMAND OF
TYPE IMPORT SPECIFYING THE
TEMPORARY ROOT TEMPLATE — 1306

SPECIFY A MAPPING OF A NESTED
STACK RESOURCE TO A STACK ID
FOR A NESTED STACK REFERENCED
IN THE NESTED STACK RESOURCE — 1308

FIG. 14

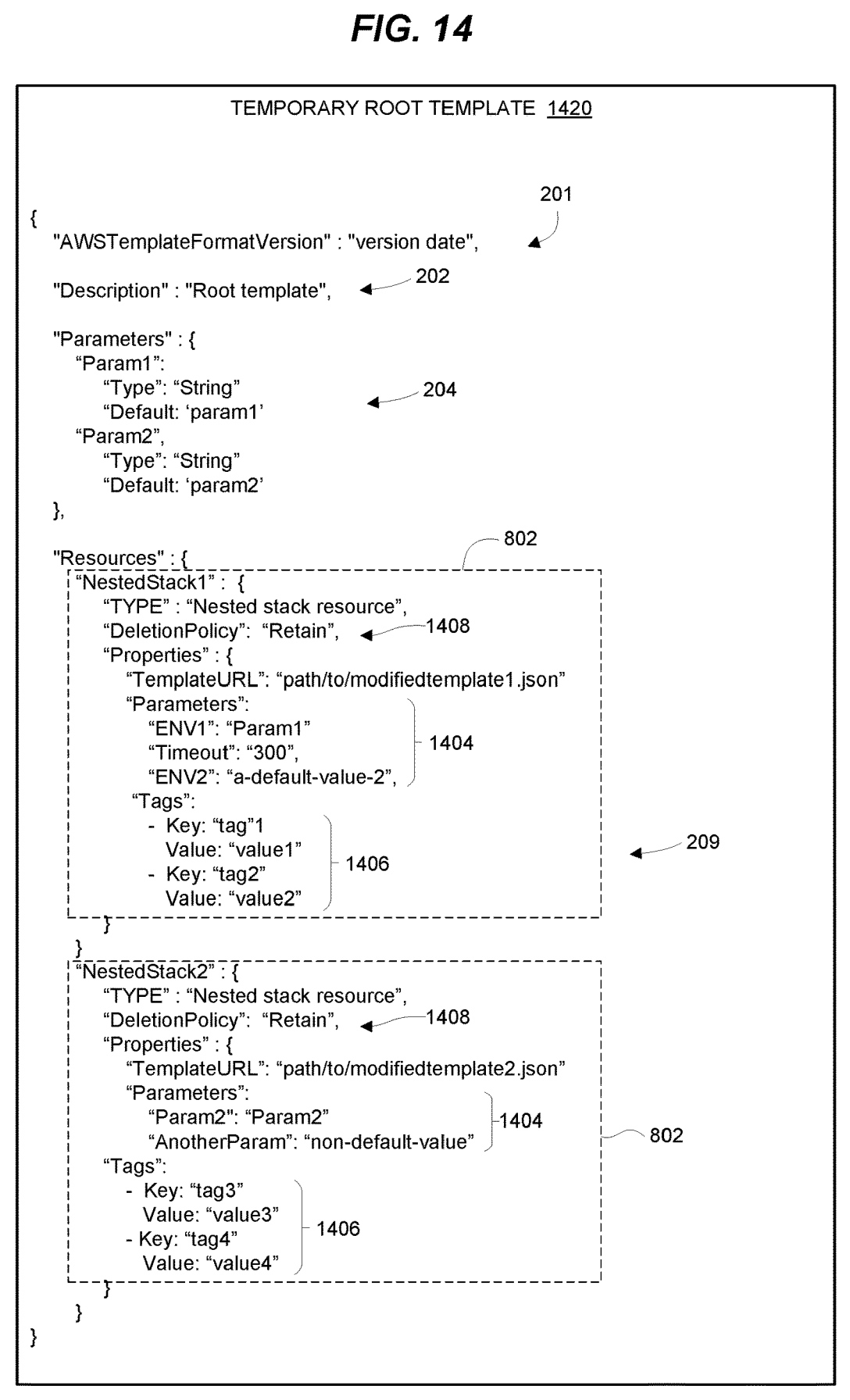

```
                    TEMPORARY ROOT TEMPLATE  1420

201
{
   "AWSTemplateFormatVersion" : "version date",

"Description" : "Root template",        202

"Parameters" : {
      "Param1":
         "Type": "String"                        204
         "Default: 'param1'
      "Param2",
         "Type": "String"
         "Default: 'param2'
   },
                                                  802
   "Resources" : {
      "NestedStack1" : {
         "TYPE" : "Nested stack resource",
         "DeletionPolicy": "Retain",         1408
         "Properties" : {
            "TemplateURL": "path/to/modifiedtemplate1.json"
            "Parameters":
               "ENV1": "Param1"
               "Timeout": "300",                1404
               "ENV2": "a-default-value-2",
            "Tags":
               - Key: "tag"1
                 Value: "value1"
               - Key: "tag2"          1406                    209
                 Value: "value2"
         }
      }
      "NestedStack2" : {
         "TYPE" : "Nested stack resource",
         "DeletionPolicy": "Retain",         1408
         "Properties" : {
            "TemplateURL": "path/to/modifiedtemplate2.json"
            "Parameters":
               "Param2": "Param2"               1404
               "AnotherParam": "non-default-value"            802
         "Tags":
            - Key: "tag3"
              Value: "value3"
            - Key: "tag4"         1406
              Value: "value4"
         }
      }
}
```

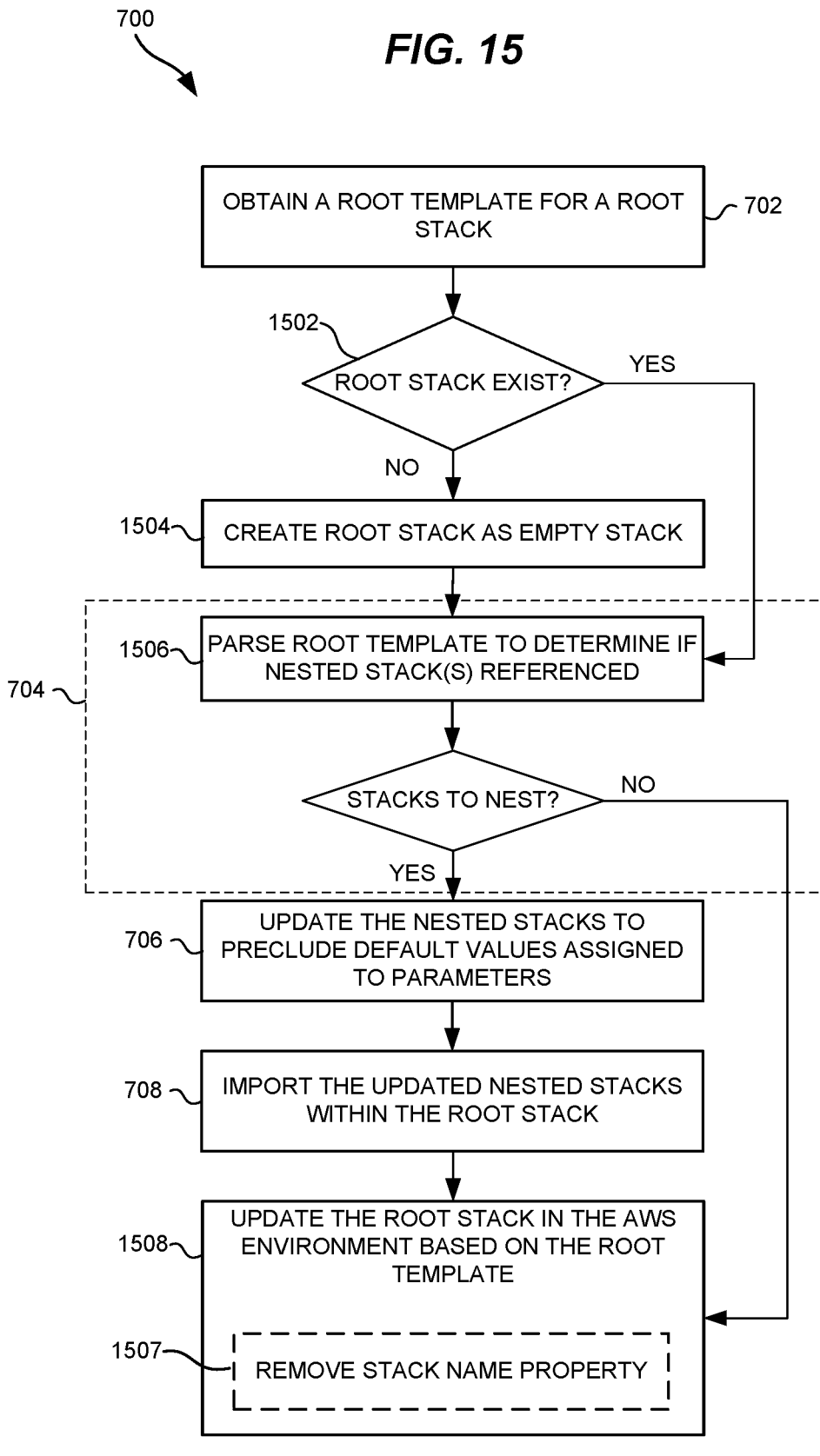

OBTAIN A ROOT TEMPLATE FOR A ROOT STACK ⌐702

1502⌐ ROOT STACK EXIST?     YES

NO

1504⌐ CREATE ROOT STACK AS EMPTY STACK

1506⌐ PARSE ROOT TEMPLATE TO DETERMINE IF NESTED STACK(S) REFERENCED

704 ⌐

STACKS TO NEST?     NO

YES

706 ⌐ UPDATE THE NESTED STACKS TO PRECLUDE DEFAULT VALUES ASSIGNED TO PARAMETERS

708 ⌐ IMPORT THE UPDATED NESTED STACKS WITHIN THE ROOT STACK

1508⌐ UPDATE THE ROOT STACK IN THE AWS ENVIRONMENT BASED ON THE ROOT TEMPLATE

1507⌐ REMOVE STACK NAME PROPERTY

FIG. 18

EMPTY ROOT TEMPLATE 1820

```
{
    "AWSTemplateFormatVersion" : "version date",

"Description" : "JSON string",

"Metadata" : {
        template metadata
    }                                               1204
    "Conditions" : {
        "ForceDoNothing" : {                        207
            "Fn::Equals": ["true", "false"]
        }
    }, "Resources" : {
        "ResourceE" : {                             209
            "TYPE" : "Resource type",
            "Condition":  "ForceDoNothing",
            "Properties" : {
                    Set of properties
            }
        }

},

}
```

AUTOMATED NESTING OF EXISTING STACKS IN A ROOT STACK WITHIN AN AWS ENVIRONMENT

TECHNICAL FIELD

The following disclosure relates to the field of cloud-computing platforms, and in particular, to nested stacks.

BACKGROUND

Cloud-computing allows users access to a variety of services over an internet connection. One example of a cloud-computing platform is Amazon Web Services (AWS). To assist in building and managing a cloud infrastructure, AWS provides a service (e.g., AWS CloudFormation) that creates and manages a collection of resources (also referred to as AWS resources). For AWS CloudFormation, for example, a user creates a template that describes resources and their associated properties, and the AWS CloudFormation service creates a stack by automatically deploying the resources described in the template. A stack comprises a collection of AWS resources that is managed as a single unit. A user can create, update, or delete the collection of resources by creating, updating, or deleting stacks.

A user may deploy multiple stacks in an AWS environment. One problem occurs when a user wants to create a nested stack from an existing stack in the AWS environment. A nested stack is a stack created as part of another stack. To create a nested stack within another stack (e.g., a root stack), the template for the root stack references the nested stack with a nested stack resource (e.g., AWS::CloudFormation:: Stack). However, an error may occur when attempting to import the existing stack into the root stack.

SUMMARY

Embodiments described herein provide an automated process of moving one or more existing stacks in an AWS environment into another stack. As an overview, a system as described herein receives a root template for a root stack that is deployed or will be deployed in the AWS environment. The system identifies one or more existing stacks that are referenced in the root template as nested stacks, and updates the existing stacks in the AWS environment to preclude parameters from being assigned default values. The system then imports the updated existing stacks into the root stack. One technical benefit is existing stacks in the AWS environment can be moved to another stack in an automated fashion while avoiding error scenarios.

One embodiment comprises a stack nesting system comprising at least one processor and memory. The processor causes the stack nesting system to obtain a root template that describes a root stack in an AWS environment, identify a nested stack existing in the AWS environment that is referenced in the root template, interact with an AWS provisioning service to update the nested stack to preclude default values assigned to parameters of the nested stack, and interact with the AWS provisioning service to import the nested stack within the root stack in the AWS environment.

One embodiment comprises a method of moving one or more existing stacks into a root stack. The method comprises obtaining a root template that describes the root stack in an AWS environment, identifying a nested stack existing in the AWS environment that is referenced in the root template, interacting with an AWS provisioning service to update the nested stack to preclude default values assigned to parameters of the nested stack, and interacting with the AWS provisioning service to import the nested stack within the root stack in the AWS environment.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

FIG. 2 illustrates the anatomy of a template.

FIG. 8 illustrates a root template in an illustrative embodiment.

FIG. 9 is a flow chart illustrating a method of updating a nested stack in an illustrative embodiment.

FIG. 10 illustrates a nested stack template in an illustrative embodiment.

FIGS. 11-12 illustrate modified nested stack templates in illustrative embodiments.

FIG. 14 illustrates a temporary root template in an illustrative embodiment.

FIG. 15 is a flow chart illustrating additional details of the method of FIG. 7 in an illustrative embodiment.

FIG. 18 illustrates an empty root template in an illustrative embodiment.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
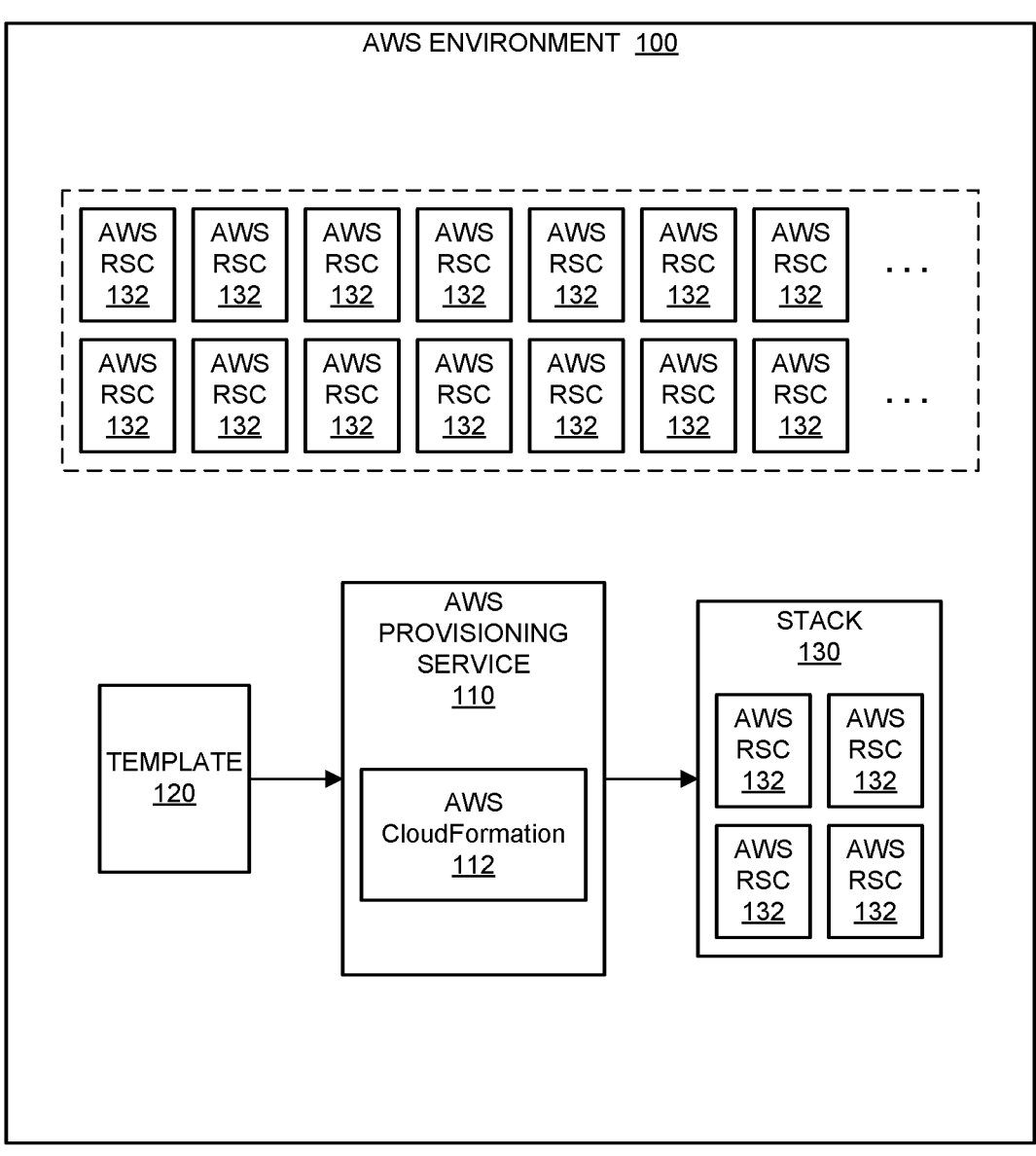
FIG. 1 illustrates an AWS environment.

FIG. 1 illustrates an AWS environment 100. AWS environment 100 includes a pool of AWS resources (AWS RSC) 132 (also generally referred to herein as resources) available to a user when building a cloud infrastructure. For example, AWS resources 132 may comprise Amazon Elastic Compute Cloud (Amazon EC2) instances, Load Balancers, Auto Scaling Groups, Relational Database Service (RDS) Database Instances and security groups, Simple Notification Service (SNS), Amazon CloudWatch alarms, Amazon Simple Queue Service (SQS), Amazon SimpleDB domains, etc. AWS environment 100 includes an AWS provisioning service 110, which is an infrastructure automation service that automates the setup and deployment of AWS resources 132. A user may access the AWS provisioning service 110 to select one or more of the AWS resources 132 to build a desired cloud infrastructure. One example of the AWS provisioning service 110 is the AWS CloudFormation service 112.

The AWS provisioning service 110 uses a template 120 (also referred to as an AWS template, stack template, etc.) to automate the setup of AWS resources 132. A template 120 describes the AWS resources 132 that a user wants to provision in the AWS environment 100. FIG. 2 illustrates the anatomy of a template 120. A template 120 may include the following sections: template format version section 201, description section 202, metadata section 203, parameters section 204, rules section 205, mappings section 206, conditions section 207, transform section 208, resources section 209, and outputs section 210. The template format version section 201 indicates the template version (e.g., AWS CloudFormation) of the template 120, the description section 202 is a text string that describes the template 120, and the metadata section 203 provides additional information about the template 120. The parameters section 204 describes the parameters and their associated parameter values to pass to the template 120 at runtime (when creating or updating a stack). The rules section 205 describes rules used to validate a parameter or a combination of parameters passed to a template 120 during stack creation or stack update. The mapping section 206 describes mappings of keys and associated values that may be used to specify conditional parameter values. The conditions section 207 controls whether certain AWS resources 132 are created or whether certain resource properties are assigned a value during stack creation or stack update. The transform section 208 is used for serverless applications to specify the version of the AWS Serverless Application Model (AWS SAM) to use. The resources section 209 describes the AWS resources 132 and their properties. The outputs section 210 describes the values that are returned, such as when viewing the stack properties or when the values are used in templates of other stacks. Template 120 is in a text-based structured format, such as YAML Ain't Markup Language (YAML) or JavaScript Object Notation (JSON), although other structured formats or file types are considered herein.

In FIG. 1, the AWS provisioning service 110 uses the template 120 to build a stack 130 (also referred to as an AWS stack). The AWS provisioning service 110 provisions and configures AWS resources 132 by making calls to AWS services that are described in the template 120. As described above, stack 130 comprises a collection of AWS resources 132 that is managed as a single unit. For example, a user can create, update, or delete a collection of AWS resources 132 by creating, updating, or deleting stacks. All of the AWS resources 132 in a stack 130 are defined by the template 120.

Figure 3:
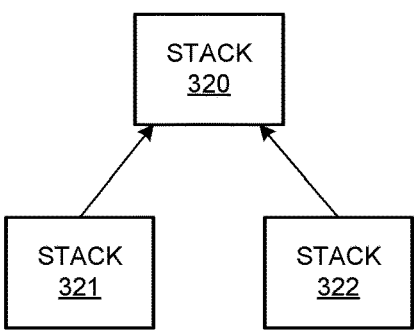
FIG. 3 illustrates nesting of stacks.

One assumption herein is that the AWS provisioning service 110 allows for nested stacks, which is a stack created as part of another stack. FIG. 3 illustrates nesting of stacks, where a root stack 320 is the top-level stack to which other nested stacks 321-322 belong. In this example, root stack 320 is the parent stack for nested stacks 321-322, and nested stacks 321-322 are children stacks of root stack 320.

Figure 4:
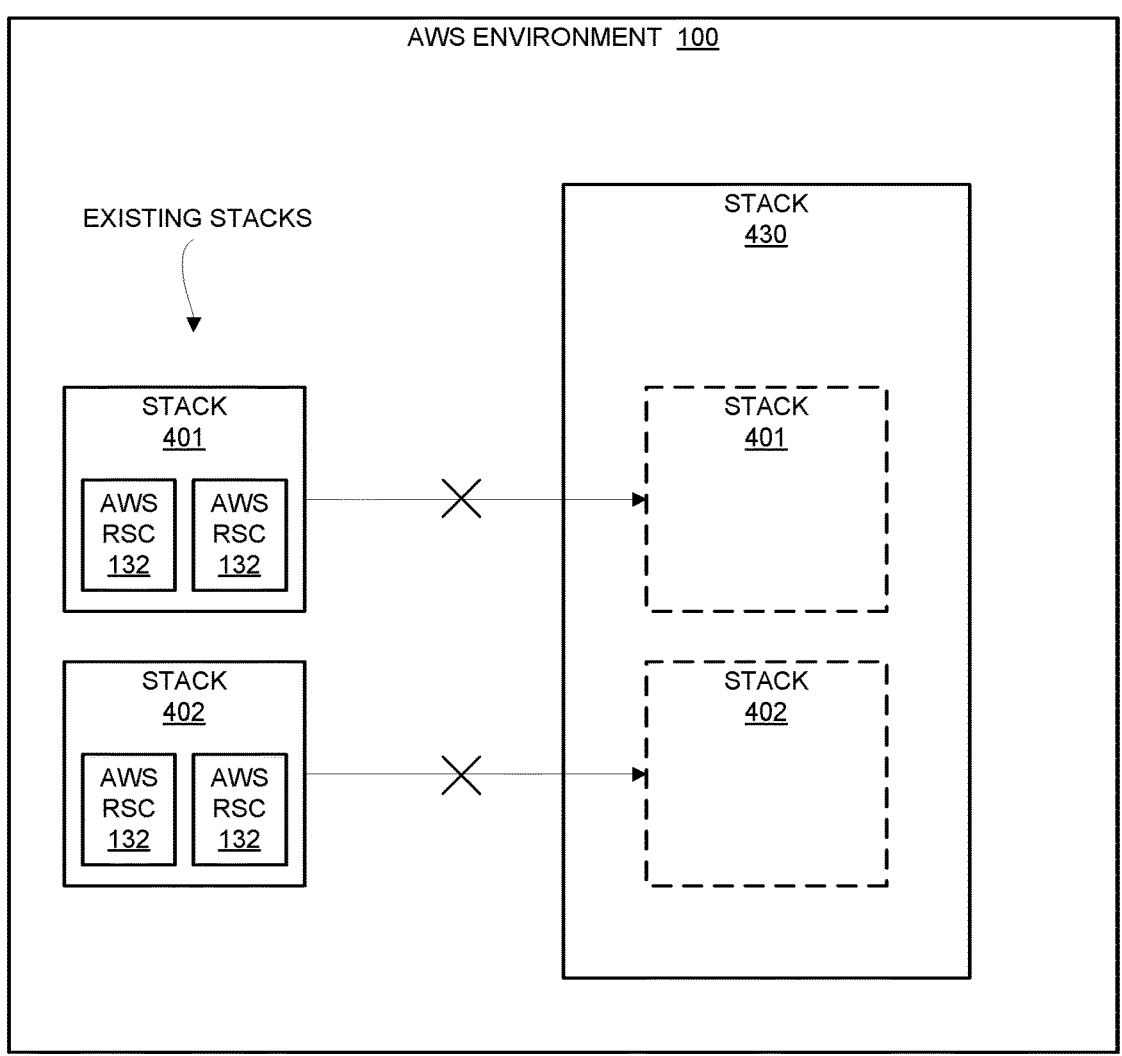
FIG. 4 illustrates an error scenario for an AWS provisioning service.

One problem with an AWS provisioning service 110, such as the AWS CloudFormation service 112, may be encountered when trying to move one or more existing stacks into another stack. FIG. 4 illustrates an error scenario for the AWS provisioning service 110. In this scenario, stacks 401-402 are created each comprising a collection of AWS resources 132 that are provisioned in the AWS environment 100. In other words, each of stacks 401-402 was provisioned by the AWS provisioning service 110 based on a dedicated template 120. Also shown is stack 430, which is an existing or prospective stack that is provisioned or will be provisioned by the AWS provisioning service 110 based on a dedicated template 120. If a user attempted to import stacks 401-402 into stack 430, then an error may occur. For example, assume that a user generates an updated template 120 for stack 430 that includes nested stack resources (e.g., AWS::CloudFormation::Stack). If the AWS provisioning service 110 attempts to create an import change set for stack 430 based on the updated template 120, an error may occur when stacks 401-402 include parameters that are assigned a default value property. This makes it impossible to nest already-deployed stacks that use the default parameter property with the AWS provisioning service 110.

Figure 5:
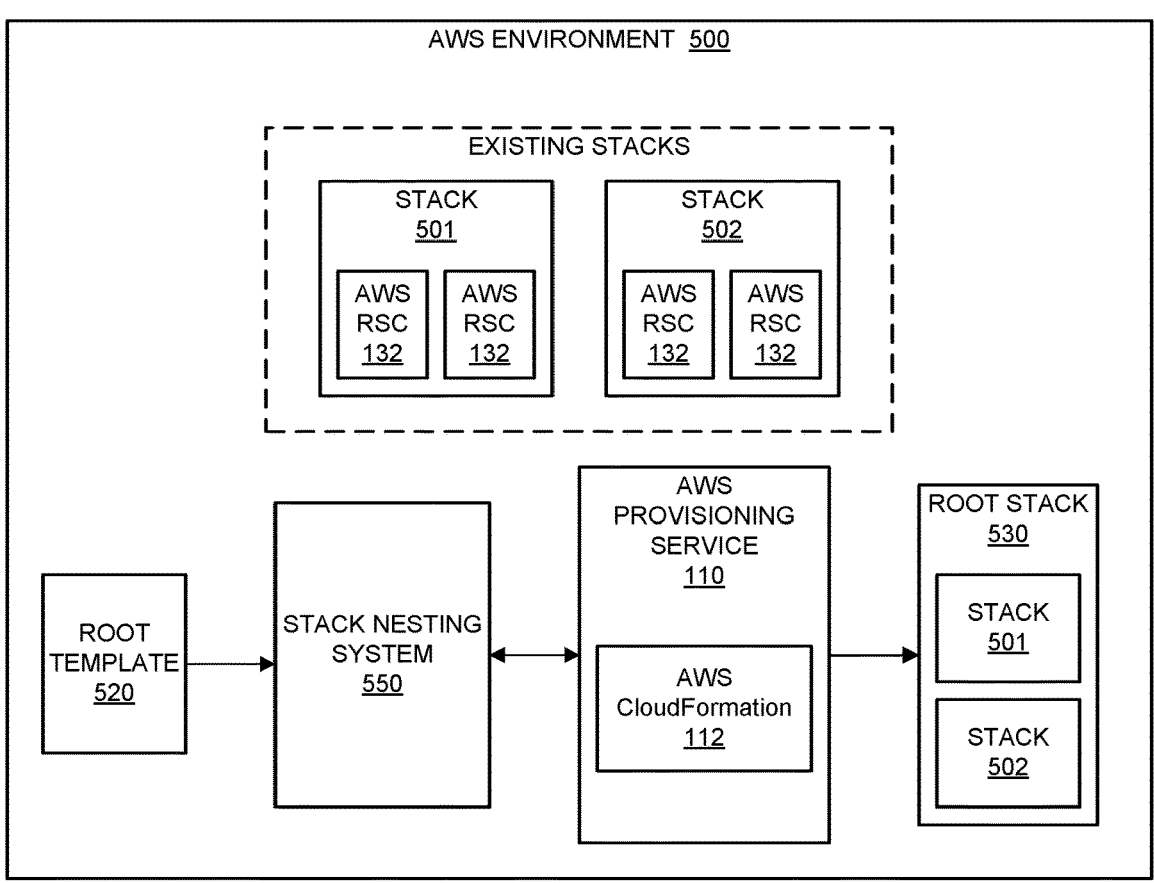
FIG. 5 illustrates an AWS environment in an illustrative embodiment.

Embodiments described below are able to solve this and other related problems by providing an automated solution for importing one or more existing stacks into another stack. FIG. 5 illustrates an AWS environment 500 in an illustrative embodiment. In this embodiment, it is assumed that stacks 501-502 are existing within AWS environment 500. For example, a template 120 described the AWS resources 132 to provision in the AWS environment 500 for stack 501, and the AWS provisioning service 110 used the template 120 to create stack 501. Similarly, another template 120 described the AWS resources 132 to provision in the AWS environment 500 for stack 502, and the AWS provisioning service 110 used the template 120 to build stack 502. Other stacks may also be existing, but stacks 501-502 are shown for the sake of brevity. It is also assumed that a user desires to move stacks 501-502 into a root stack 530 so that stacks 501-502 become nested stacks within root stack 530.

Figure 6:
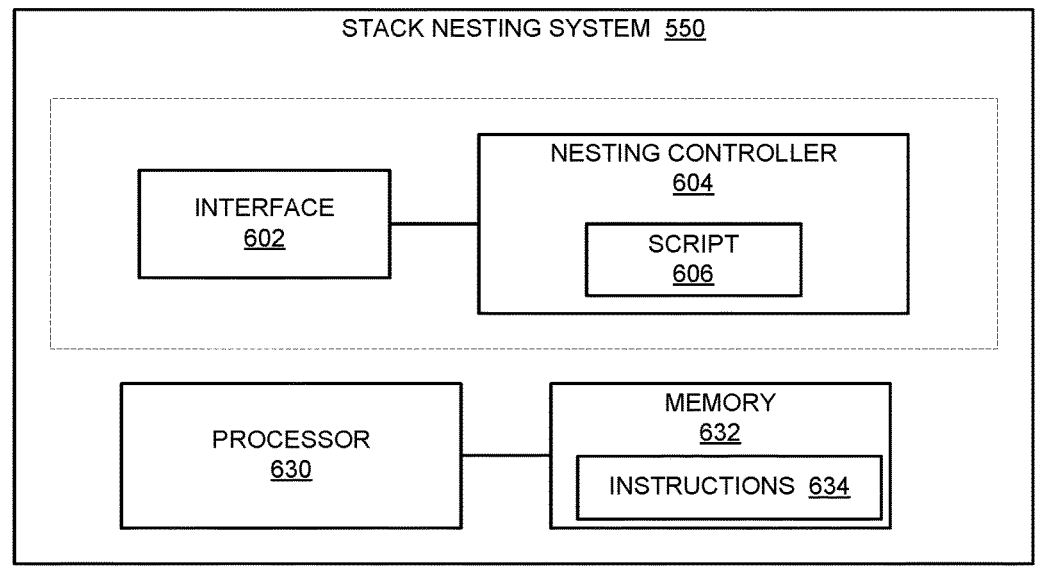
FIG. 6 is a block diagram of a stack nesting system in an illustrative embodiment.

In this embodiment, a stack nesting system 550 is implemented in AWS environment 500. Stack nesting system 550 is configured to interact with the AWS provisioning service 110 to provide an automated solution for nesting one or more of existing stacks 501-502 into a root stack 530. FIG. 6 is a block diagram of stack nesting system 550 in an illustrative embodiment. In this embodiment, stack nesting system 550 includes the following subsystems: an interface component 602 and a nesting controller 604. Interface component 602 is a hardware component or circuitry that communicates with external device, systems, or entities, such as the AWS provisioning service 110. For example, interface component 602 may exchange communications with the AWS provisioning service 110 over a network connection, such as messages, data, Application Programming Interface (API)

calls, etc. Interface component 602 may exchange communications with a developer, a user, etc., to receive or obtain a template for a stack, such as by receiving a template file over a network connection, retrieving a template from a storage location (e.g., Amazon Simple Storage Service (Amazon S3) bucket), etc. Interface component 602 may use a variety of protocols for communication. Nesting controller 604 comprises circuitry, logic, hardware, means, etc., configured to parse templates, interact with the AWS provisioning service 110 to retrieve information, create or update stacks, and/or perform other functions for stack nesting system 550 that are described in more detail below.

One or more of the subsystems of stack nesting system 550 may be implemented on a hardware platform comprised of analog and/or digital circuitry. One or more of the subsystems of stack nesting system 550 may be implemented on a processor 630 that executes instructions 634 stored in memory 632. A processor 630 comprises an integrated hardware circuit configured to execute instructions 634 to provide the functions of stack nesting system 550. Processor 630 may comprise a set of one or more processors or may comprise a multi-processor core, depending on the particular implementation. Memory 632 is a non-transitory computer readable medium for data, instructions, applications, etc., and is accessible by processor 630. Memory 632 is a hardware storage device capable of storing information on a temporary basis and/or a permanent basis. Memory 632 may comprise a random-access memory, or any other volatile or non-volatile storage device. One or more of the subsystems of stack nesting system 550 may be implemented on cloud resources, such as AWS resources.

Stack nesting system 550 may include various other components not specifically illustrated in FIG. 6.

Figure 7:
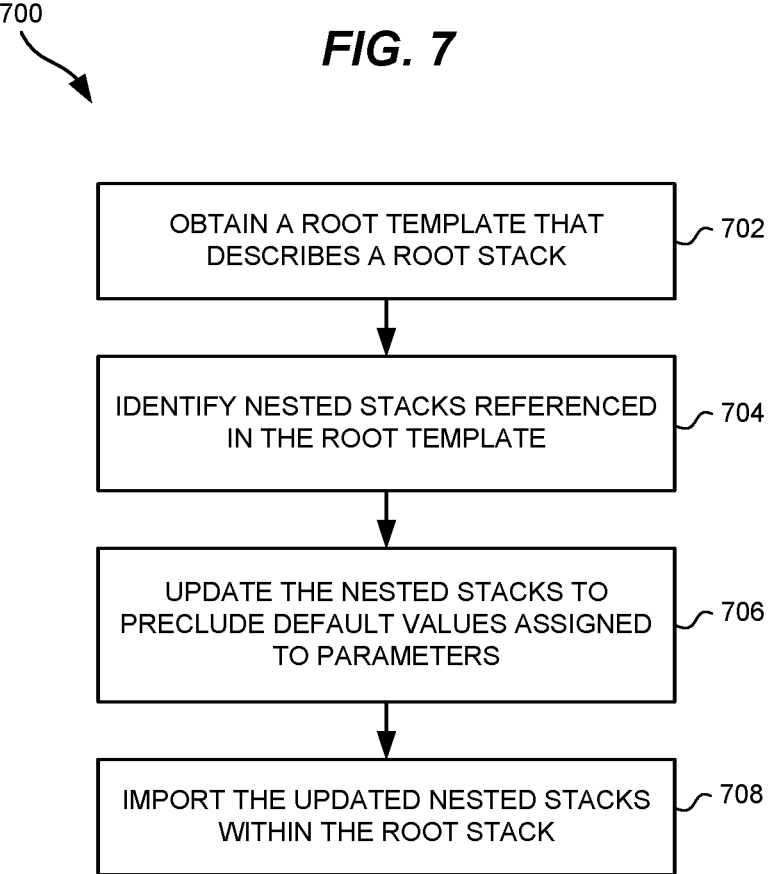
FIG. 7 is a flow chart illustrating a method of moving one or more existing stacks into a root stack in an illustrative embodiment.

FIG. 7 is a flow chart illustrating a method 700 of moving one or more existing stacks 501-502 into a root stack 530 in an illustrative embodiment. The steps of method 700 will be described with reference to stack nesting system 550 in FIG. 6, but those skilled in the art will appreciate that method 700 may be performed in other systems or devices. Also, the steps of the flow charts described herein are not all inclusive and may include other steps not shown, and the steps may be performed in an alternative order.

In this embodiment, nesting controller 604 obtains, retrieves, or receives a root template 520 that describes a root stack 530 (step 702) from a user, a developer, or the like. The root template 520 may be an original template that describes the AWS resources 132 that the user wants to provision when creating a root stack 530 in the AWS environment 500, or may be a modified or updated template for updating an existing root stack 530 in the AWS environment 500 after it is deployed. FIG. 8 illustrates a root template 520 in an illustrative embodiment. Root template 520 as shown in FIG. 8 is merely an example, and may vary as desired. Root template 520 may include one or more of the sections described above in FIG. 2. The resources section 209 is mandatory in a template, so root template 520 includes a description of one or more resources. A stack itself is considered a resource, and root template 520 references one or more stacks 501-502 that are already existing in the AWS environment 500 to create nested stacks. Root template 520 uses a nested stack resource 802 to reference stacks 501-502. The nested stack resource 802 (e.g., "AWS:: CloudFormation::Stack" resource) is a type of resource that creates a nested stack within another stack. In the example in FIG. 8, root template 520 includes a nested stack resource 802 with a logical resource ID of "NestedStack1", and includes a nested stack resource 802 with a logical resource ID of "NestedStack2". Root template 520 may describe other resources as desired, such as resources that do not reference a nested stack.

Also in FIG. 8, each nested stack resource 802 specifies or describes a stack name property 804 (i.e., "StackName"). A stack name property 804 describes a stack name (e.g., AWS StackName) given to a stack when created in the AWS environment 500. For example, the "NestedStack1" resource includes a stack name property 804 that indicates the stack name for stack 501 (i.e., "STACK_501"), and the "NestedStack2" resource includes a stack name property 804 that indicates the stack name for stack 502 (i.e., "STACK_502").

In FIG. 7, nesting controller 604 identifies one or more nested stacks 501-502 referenced in the root template 520 (step 704). For example, nesting controller 604 may parse the root template 520 to identify the stack name property 804 for one or more nested stacks 501-502 referenced in the resources section 209 of the root template 520. Nesting controller 604 interacts with the AWS provisioning service 110 to update the nested stacks 501-502 to preclude a default property assigned to parameters in the nested stacks 501-502 (step 706). For example, each of nested stacks 501-502 is created from a template 120, and the template 120 describes one or more parameters that are assigned values at runtime of the AWS provisioning service 110. A parameter described in the template 120 for stack 501 or stack 502 may specify a default property, and a default value will be assigned to that parameter if no value is passed in at runtime. This can cause a problem when attempting to move a nested stack 501-502 into root stack 530, so nesting controller 604 updates nested stacks 501-502 to remove the default property from all parameters in the template.

FIG. 9 is a flow chart illustrating a method 900 of updating a nested stack 501-502 in an illustrative embodiment. Nesting controller 604 retrieves a nested stack template for the nested stack 501 (step 902). For example, nesting controller 604 may use a get template command (e.g., aws cloudformation get-template command) to retrieve the nested stack template for the nested stack 501. FIG. 10 illustrates a nested stack template 1020 in an illustrative embodiment. Nested stack template 1020 as shown in FIG. 10 is merely an example for nested stack 501, and may vary as desired. Nested stack template 1020 may include one or more of the sections described above in FIG. 2. In this embodiment, nested stack template 1020 describes a parameter 1002 (e.g., ParameterC) in parameters section 204 with a default property 1004, although other parameters may be included in parameters section 204. The default property 1004 for parameter 1002 specifies a default value for this parameter. Thus, this parameter 1002 was assigned a default value when nested stack 501 was created by the AWS provisioning service 110 in the AWS environment 500 if no other value for that parameter was passed in. A parameter 1002 declaring a default property 1004 may be referred to as a default value parameter herein.

In FIG. 9, nesting controller 604 modifies the nested stack template 1020 for the nested stack 501 to generate an updated or modified template for nested stack 501. Nesting controller 604 modifies the nested stack template 1020 to remove the default property 1004 from each of the parameters 1002 that declare the default property 1004 (step 904). For example, nesting controller 604 may parse the parameters section 204 of the nested stack template 1020 to identify each parameter 1002 that declares a default property 1004, and remove the default property 1004 from that parameter 1002. FIGS. 11-12 illustrate modified nested stack templates 1120 in illustrative embodiments. Again, modified nested stack template 1120 as shown in FIGS. 11-12 are merely examples, and may vary as desired. In this embodiment, nesting controller 604 has removed a default property 1004 from any parameter 1002 in the modified nested stack template 1120.

In FIG. 9, nesting controller 604 also modifies the nested stack template 1120 to include a benign change that induces the AWS provisioning service 110 to create a change set for the nested stack 501 (step 906). A benign change is a small or inconsequential change to nested stack template 1020 that does not alter the configuration of the resources in the nested stack 501, but induces the AWS provisioning service 110 to create a change set for the nested stack 501. In one embodiment, nesting controller 604 may specify or describe a dummy output in the modified nested stack template 1120 as the benign change (optional step 910). As shown in FIG. 11, nesting controller 604 has included a dummy output 1112 as a benign change 1110 in modified nested stack template 1120. In another embodiment (see FIG. 9), nesting controller 604 may specify or describe a dummy resource in the modified nested stack template 1120 as the benign change 1110 (optional step 912), and specify or describe a failure condition in the modified nested stack template 1120 to create the dummy resource dependent on a decision that will be false (optional step 914). As described above, a condition controls whether certain resources 132 are created or whether certain resource properties are assigned a value during stack creation or stack update. Thus, nesting controller 604 may insert a condition in the modified nested stack template 1120, and that condition will evaluate to false so that the dummy resource is not created in the nested stack 501. In FIG. 12, for example, nesting controller 604 inserts failure condition 1204 in conditions section 207 that is guaranteed to be false. Nesting controller 604 also adds a dummy resource 1212 as a benign change 1410 in modified nested stack template 1120, and a reference to the failure condition 1204 in the dummy resource 1212. Thus, dummy resource 1212 will not be created for the nested stack 501 based on the modified nested stack template 1120. Although two examples were shown, other benign changes 1110 are considered herein.

In FIG. 9, nesting controller 604 then interacts with the AWS provisioning service 110 to update or redeploy the nested stack 501 in the AWS environment 500 based on the modified nested stack template 1120 (step 908). To interact with the AWS provisioning service 110, nesting controller 604 may use script 606, which is a program or sequence of instructions, such as a Jenkinsfile. Nesting controller 604 uses script 606 to contact the AWS provisioning service 110 (e.g., AWS CloudFormation) and run a create change set command (e.g., aws cloudformation create-change-set command) for nested stack 501 specifying the modified nested stack template 1120, setting any desired options for nested stack 501, etc. For example, nesting controller 604 may use the AWS Command Line Interface (CLI) to run the create-change-set command at the AWS provisioning service 110. In response, the AWS provisioning service 110 compares the nested stack 501 with the changes submitted in the modified nested stack template 1120 to generate the change set. If the only change to the nested stack 501 was removal of the default property 1004 from a parameter 1002, the AWS provisioning service 110 would not create a change set. In other words, the AWS provisioning service 110 would not identify removal of the default properties in this manner from the modified nested stack template 1120 as a change that requires a change set be created for the nested stack 501.

By adding the benign change 1110 to the modified nested stack template 1120, the AWS provisioning service 110 will be induced to create a change set for the nested stack 501. Nesting controller 604 then runs an execute change-set command (e.g., aws cloudformation execute-change-set command) to execute the change set for nested stack 501. After the change set is executed by the AWS provisioning service 110, the nested stack 501 will be updated so that each of its parameters no longer has a default property.

Nesting controller 604 may perform method 900 for each of the nested stacks 501-502 referenced in the root template 520, so that each of the nested stacks 501-502 is updated accordingly.

Figure 13:
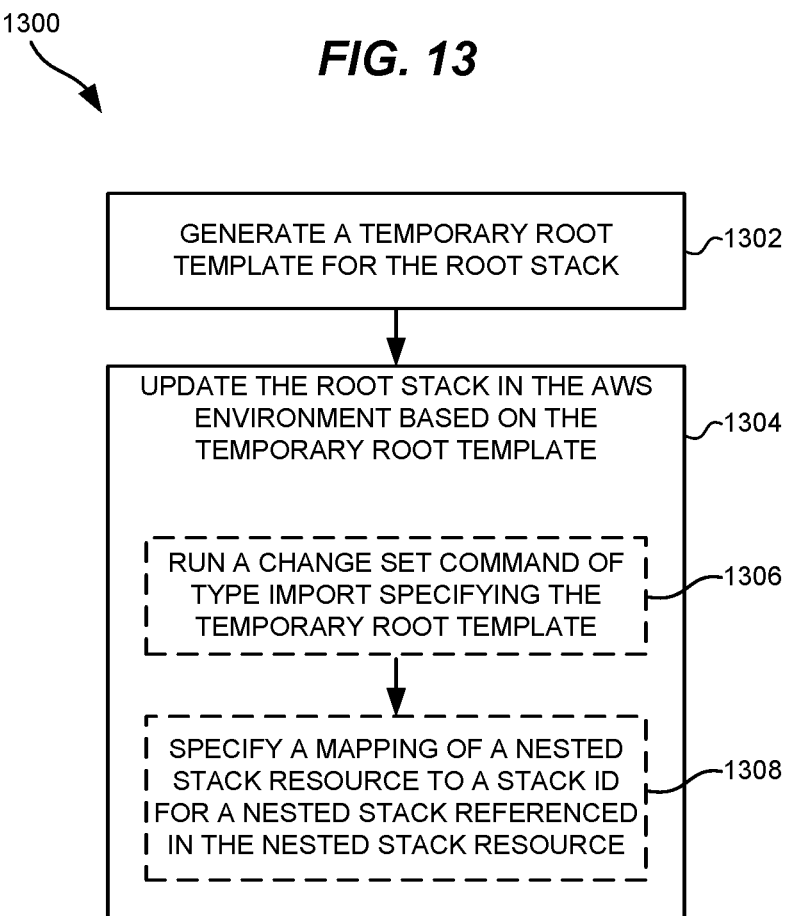
FIG. 13 is a flow chart illustrating a method of importing updated nested stacks within a root stack in an illustrative embodiment.

With the nested stacks 501-502 updated in the AWS environment 500 in FIG. 7, nesting controller 604 interacts with the AWS provisioning service 110 to import the updated nested stacks 501-502 within the root stack 530 in the AWS environment 500 (step 708). FIG. 13 is a flow chart illustrating a method 1300 of importing the updated nested stacks 501-502 within the root stack 530 in an illustrative embodiment. Nesting controller 604 generates a temporary root template for root stack 530 from the root template 520 (step 1302). FIG. 14 illustrates a temporary root template 1420 in an illustrative embodiment. Nesting controller 604 specifies or describes the nested stack resources 802 that reference stacks 501-502 in the resources section 209 of the temporary root template 1420. For example, nesting controller 604 may copy the nested stack resources 802 from the root template 520, but remove the stack name property 804 from the nested stack resources 802. Nesting controller 604 may also specify or describe a list 1404 of parameters and/or a list 1406 of tags associated with the nested stack resources 802 in the temporary root template 1420. Nesting controller 604 may also specify or describe a deletion policy attribute 1408 for the nested stack resources 802 with a retain option.

In FIG. 13, nesting controller 604 interacts with the AWS provisioning service 110 to update or redeploy the root stack 530 in the AWS environment 500 based on the temporary root template 1420 (step 1304). To interact with the AWS provisioning service 110, nesting controller 604 may use script 606 to contact the AWS provisioning service 110 (e.g., AWS CloudFormation) and run a change set command of type import specifying the temporary root template 1420, setting any desired options for root stack 530, etc. (optional step 1306). The change set command of type import is used to move resources between, or refactor, stacks. Nesting controller 604 also specifies a mapping of a nested stack resource 802 to a stack ID for a nested stack 501-502 referenced in the nested stack resource 802 (optional step 1308). The AWS provisioning service 110 predefines certain pseudo parameters that aren't declared in a template when creating a stack. The AWS provisioning service 110 creates a unique identifier for a stack, called the stack ID or Amazon Resource Name (ARN), when the stack is created with a "create-stack" command or the like (e.g., "aws cloudformation create-stack command"). The stack ID is mapped to the stack name defined for the stack by a user. Nesting controller 604 may identify a stack name from the stack name property 804 (i.e., "StackName") specified in a nested stack resource 802 from the root stack 530, and retrieve a stack ID for the nested stack 501-502 from the AWS provisioning service 110 based on the stack name. For example, nesting controller 604 may use a describe-stacks command or the like to retrieve a stack ID for a nested stack 501-502 from the AWS provisioning service 110 based on a stack name. Nesting controller 604 may then provide a mapping of a logical resource ID for the nested stack resource 802 to the stack ID for a nested stack 501-502 referenced in the nested stack resource 802 to the AWS provisioning service 110. In response to the change set command, the AWS provisioning service 110 compares the root stack 530 with the changes submitted in the temporary root template 1420 to generate the change set. Nesting controller 604 then runs an execute change set command for root stack 530 to execute the change set for the root stack 530. After the change set is executed by the AWS provisioning service 110, the root stack 530 will be updated so that nested stacks 501-502 are imported, moved, or refactored into root stack 530. At this point, the root stack 530 has the nested stacks 501-502 moved into the root stack 530.

Figure 16:
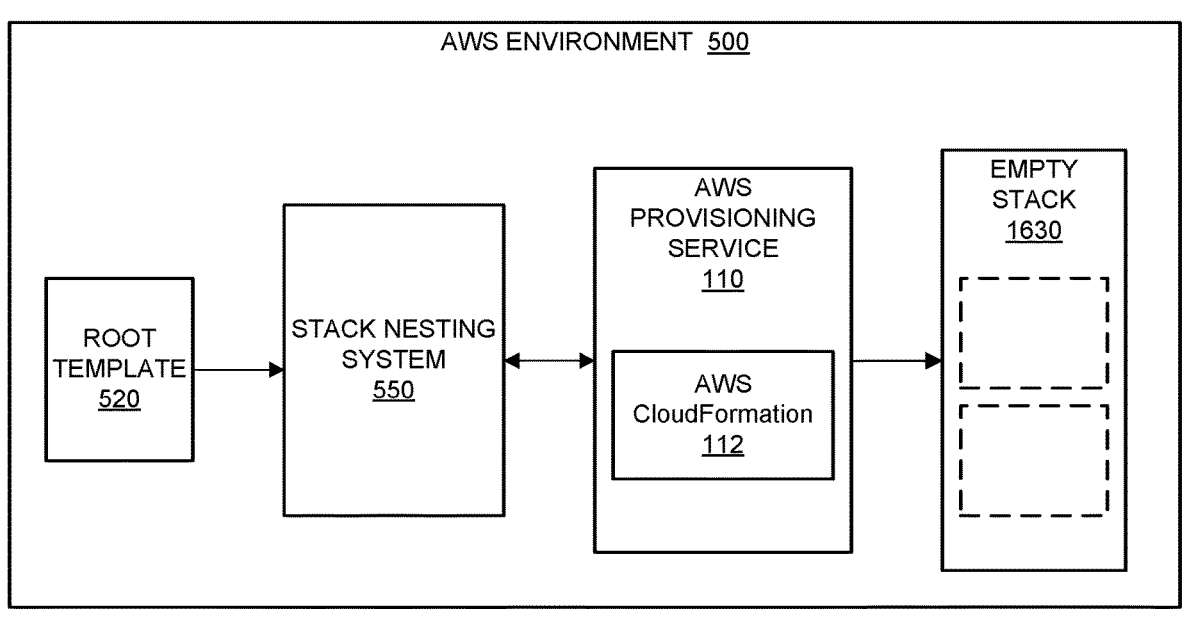
FIG. 16 illustrates an empty stack deployed in an AWS environment in an illustrative embodiment.

FIG. 15 is a flow chart illustrating additional details of method 700 in an illustrative embodiment. When initially obtaining the root template 520 in method 700, the root stack 530 may or may not exist in the AWS environment 500. Thus, nesting controller 604 may determine whether the root stack 530 is created in the AWS environment 500 (step 1502). When the root stack 530 exists in the AWS environment 500, method 700 proceeds to step 704. When the root stack 530 is not created in the AWS environment 500, nesting controller 604 interacts with the AWS provisioning service 110 to create root stack 530 in the AWS environment 500 as an empty stack (step 1504). An empty stack is a stack created by the AWS provisioning service 110 devoid of resources 132. FIG. 16 illustrates an empty stack 1630 deployed in the AWS environment 500 in an illustrative embodiment. Empty stack 1630 is essentially an empty shell at this point without resources 132 provisioned, and resources 132 will be moved or imported into the empty stack 930 in subsequent operations.

Figure 17:
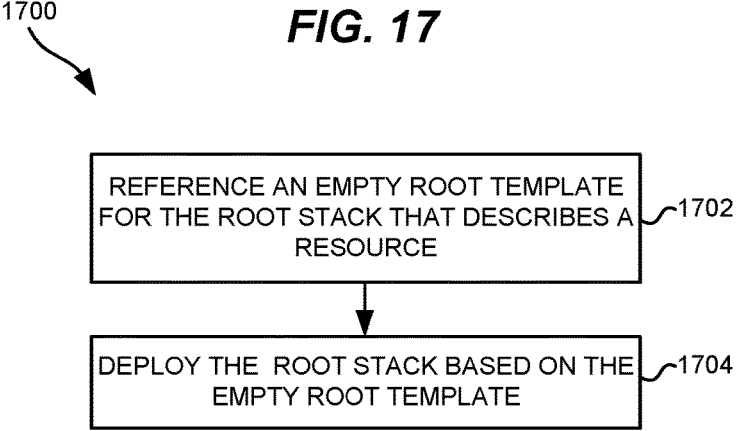
FIG. 17 is a flow chart illustrating a method of deploying a root stack as an empty stack in an illustrative embodiment.

FIG. 17 is a flow chart illustrating a method 1700 of deploying a root stack 530 as an empty stack 1630 in an illustrative embodiment. In this embodiment, nesting controller 604 references an empty root template for the root stack 530 that specifies or describes a resource 132 (step 1702). FIG. 18 illustrates an empty root template 1820 in an illustrative embodiment. The resources section 209 of empty root template 1820 specifies a resource (e.g., ResourceE), although it may include other resource descriptions. Empty root template 1820 may include information from the root template 520, such as parameters, rules, outputs, etc., but nesting controller 604 at least includes the resource description for one resource. The resource entered in the empty root template 1820 could be a resource described in the root template 520, or could be a dummy resource. The empty root template 1820 also specifies or describes a condition in the empty root template 1820, and that condition will be false so that a corresponding resource 132 is not created in the empty stack 1630. The empty root template 1820 also specifies a reference to the failure condition 1204 in the resource 132 of resources section 209.

In FIG. 17, nesting controller 604 interacts with the AWS provisioning service 110 to create or deploy the root stack 530 in the AWS environment 500 based on the empty root template 1820 (step 1704). Thus, root stack 530 will be provisioned (e.g., initially) in the AWS environment 500, but the resource 132 that includes a reference to the failure condition 1204 will not be provisioned for root stack 530. Thus, root stack 530 is deployed as an empty stack 1630. To interact with the AWS provisioning service 110, nesting controller 604 may use script 606 to contact the AWS provisioning service 110 (e.g., AWS CloudFormation) and run a create-stack command (e.g., aws cloudformation create-stack) specifying the empty root template 1820 (e.g., the location of the template file, such as a path on a local computer or an Amazon S3 Uniform Resource Locator (URL)), a stack name for the root stack 530, input parameters, etc.

In FIG. 15, nesting controller 604 parses the root template 520 to determine whether one or more nested stacks 501-502 are referenced in the root template 520 (step 1506). When nested stacks 501-502 are referenced in the root template 520, nesting controller 604 interacts with the AWS provisioning service 110 to update the nested stacks 501-502 to preclude a default property assigned to parameters in the nested stacks 501-502 (step 706). Nesting controller 604 then interacts with the AWS provisioning service 110 to import the updated nested stacks 501-502 within the root stack 530 in the AWS environment 500 (step 708). Method 700 then proceeds to step 1508. When nested stacks 501-502 are not referenced in the root template 520 (see step 1506), method 700 proceeds to step 1508.

For step 1508, nesting controller 604 interacts with the AWS provisioning service 110 to update or redeploy the root stack 530 in the AWS environment 500 based on the root template 520 (step 1508). To interact with the AWS provisioning service 110, nesting controller 604 may use script 606 to contact the AWS provisioning service 110 (e.g., AWS CloudFormation) and run a create change set command (e.g., aws cloudformation create-change-set command) for root stack 530 specifying the root template 520, setting any desired options for root stack 530, etc. In response, the AWS provisioning service 110 compares the root stack 530 with the changes submitted in the root template 520 to generate the change set. The root stack 530 already includes nested stacks 501-502 that were imported in a prior step. This change set provisions other resources 132, parameters, etc., for the desired configuration of root stack 530 based on root template 520. Nesting controller 604 then runs an execute change set command for root stack 530 to execute the change set for the root stack 530. After the change set is executed by the AWS provisioning service 110, the root stack 530 will be updated with the desired configuration of the user.

When nested stack resources 802 of the root template 520 specify or describe a stack name property 804 (i.e., "Stack-Name"), nesting controller 604 may remove the stack name property 804 from the root template 520 before updating the root stack 530 (optional step 1507).

The above embodiments provide a technical benefit by automating the refactoring of one or more existing stacks to be nested stacks without having to delete the stacks and lose resources. This prevents down time, and allows stack to be nested in production environments without users being involved, which also improves security and efficiency.

Figure 19:
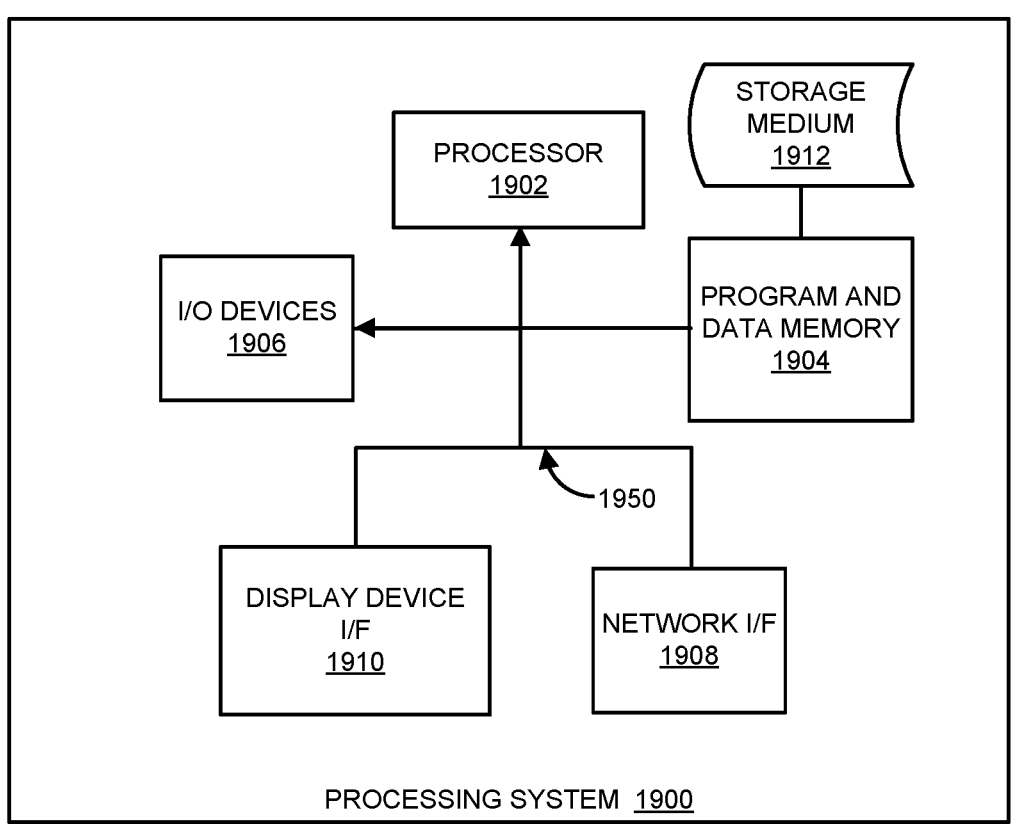
FIG. 19 illustrates a processing system operable to execute a computer readable medium embodying programmed instructions to perform desired functions in an illustrative embodiment.

Embodiments disclosed herein can take the form of software, hardware, firmware, or various combinations thereof. FIG. 19 illustrates a processing system 1900 operable to execute a computer readable medium embodying programmed instructions to perform desired functions in an illustrative embodiment. Processing system 1900 is operable to perform the above operations by executing programmed instructions tangibly embodied on computer readable storage medium 1912. In this regard, embodiments can take the form of a computer program accessible via computer-readable medium 1912 providing program code for use by a computer or any other instruction execution system. For the purposes of this description, computer readable storage medium 1912 can be anything that can contain or store the program for use by the computer.

Computer readable storage medium 1912 can be an electronic, magnetic, optical, electromagnetic, infrared, or semiconductor device. Examples of computer readable storage medium 1912 include a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1900, being suitable for storing and/or executing the program code, includes at least one processor 1902 coupled to program and data memory 1904 through a system bus 1950. Program and data memory 1904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1906 (including but not limited to keyboards, displays, pointing devices, etc.) can be coupled either directly or through intervening I/O controllers. Network adapter interfaces 1908 may also be integrated with the system to enable processing system 1900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1910 may be integrated with the system to interface to one or more display devices, such as printing systems and screens for presentation of data generated by processor 1902.

Although specific embodiments were described herein, the scope of the invention is not limited to those specific embodiments. The scope of the invention is defined by the following claims and any equivalents thereof

What is claimed is:

1. A stack nesting system comprising:
a nesting controller comprising at least one processor and memory; and
an interface component configured to communicate with an Amazon Web Services (AWS) provisioning service in an AWS environment over a network connection, the AWS environment comprising a pool of AWS resources;
wherein the AWS provisioning service comprises an infrastructure automation service that automates deployment of the AWS resources by building AWS stacks described in AWS templates;
wherein an AWS template describes the AWS resources of the pool that a user wants to provision in the AWS environment;
wherein an AWS stack comprises a collection of the AWS resources described in an associated AWS template and provisioned in the AWS environment, which is managed as a single unit;
wherein the nesting controller is configured to
perform an automated process of importing an existing AWS stack existing in the AWS environment as a nested AWS stack into a root AWS stack by:
obtaining a root AWS template that describes the AWS resources to automatically provision for the root AWS stack in the AWS environment via the AWS provisioning service;
identifying the nested AWS stack referenced by a nested stack resource in a resources section of the root AWS template, wherein the nested stack resource is a type of resource that creates the nested AWS stack within another AWS stack;

interacting with the AWS provisioning service to update the nested AWS stack to preclude default values assigned to parameters of the nested AWS stack; and
interacting with the AWS provisioning service to import the nested AWS stack within the root AWS stack in the AWS environment.

2. The stack nesting system of claim 1 wherein the nesting controller is further configured to:
retrieve a nested stack AWS template for the nested AWS stack referenced in the root AWS template;
modify the nested stack AWS template to remove a default property from each of one or more parameters that declare the default property;
modify the nested stack AWS template to include a benign change that induces the AWS provisioning service to create a change set for the nested AWS stack; and
interact with the AWS provisioning service to update the nested AWS stack in the AWS environment based on a modified nested stack AWS template.

3. The stack nesting system of claim 2 wherein the nesting controller is further configured to:
specify a dummy output in the modified nested stack AWS template as the benign change.

4. The stack nesting system of claim 2 wherein the nesting controller is further configured to:
specify a dummy resource in the modified nested stack AWS template as the benign change; and
specify a failure condition in the modified nested stack AWS template to create the dummy resource dependent on a decision that will be false.

5. The stack nesting system of claim 1 wherein the nesting controller is further configured to:
generate a temporary root AWS template for the root AWS stack, wherein the temporary root AWS template specifies the nested stack resource that references the nested AWS stack, a list of parameters associated with the nested stack resource, and a list of tags associated with the nested stack resource; and
interact with the AWS provisioning service to update the root AWS stack in the AWS environment based on the temporary root AWS template.

6. The stack nesting system of claim 5 wherein the nesting controller is further configured to:
run a change set command of type import specifying the temporary root AWS template; and
specify a mapping of a logical resource identifier for the nested stack resource to a stack identifier for the nested AWS stack referenced in the nested stack resource.

7. The stack nesting system of claim 1 wherein the nesting controller is further configured to:
interact with the AWS provisioning service to create the root AWS stack in the AWS environment as an empty stack when the root AWS stack does not exist in the AWS environment upon obtaining the root AWS template.

8. The stack nesting system of claim 1 wherein:
the nested stack resource specifies a stack name property that indicates a stack name that is mapped to a stack identifier specified by the AWS provisioning service when the nested AWS stack was created in the AWS environment; and
the nesting controller is further configured to:
remove the stack name property from the root AWS template; and interact with the AWS provisioning service to update the root AWS stack in the AWS environment based on the root AWS template.

9. The stack nesting system of claim 1 wherein:
the AWS provisioning service comprises an AWS Cloud-Formation service.

10. A method comprising:
communicating with an Amazon Web Services (AWS) provisioning service in an AWS environment over a network connection, the AWS environment comprising a pool of AWS resources;
wherein the AWS provisioning service comprises an infrastructure automation service that automates deployment of the AWS resources by building AWS stacks described in AWS templates;
wherein an AWS template describes the AWS resources of the pool that a user wants to provision in the AWS environment;
wherein an AWS stack comprises a collection of the AWS resources described in an associated AWS template and provisioned in the AWS environment, which is managed as a single unit;
wherein the method further comprises performing an automated process of importing an existing AWS stack existing in the AWS environment as a nested AWS stack into a root AWS stack by:
  obtaining a root AWS template that describes the AWS resources to automatically provision for the root AWS stack in the AWS environment via the AWS provisioning service;
  identifying the nested AWS stack referenced by a nested stack resource in a resources section of the root AWS template, wherein the nested stack resource is a type of resource that creates the nested AWS stack within another AWS stack;
  interacting with the AWS provisioning service to update the nested AWS stack to preclude default values assigned to parameters of the nested AWS stack; and
  interacting with the AWS provisioning service to import the nested AWS stack within the root AWS stack in the AWS environment.

11. The method of claim 10 wherein interacting with the AWS provisioning service to update the nested AWS stack comprises:
  retrieving a nested stack AWS template for the nested AWS stack referenced in the root AWS template;
  modifying the nested stack AWS template to remove a default property from each of one or more parameters that declare the default property;
  modifying the nested stack AWS template to include a benign change that induces the AWS provisioning service to create a change set for the nested AWS stack; and
  interacting with the AWS provisioning service to update the nested AWS stack in the AWS environment based on a modified nested stack AWS template.

12. The method of claim 11 wherein modifying the nested stack AWS template to include the benign change comprises:
  specifying a dummy output in the modified nested stack AWS template.

13. The method of claim 11 wherein modifying the nested stack AWS template to include the benign change comprises:
  specifying a dummy resource in the modified nested stack AWS template; and specifying a failure condition in the modified nested stack AWS template to create the dummy resource dependent on a decision that will be false.

14. The method of claim 10 wherein interacting with the AWS provisioning service to import the nested AWS stack within the root AWS stack comprises:
  generating a temporary root AWS template for the root AWS stack, wherein the temporary root AWS template specifies the nested stack resource that references the nested AWS stack, a list of parameters associated with the nested stack resource, and a list of tags associated with the nested stack resource; and
  interacting with the AWS provisioning service to update the root AWS stack in the AWS environment based on the temporary root AWS template.

15. The method of claim 14 wherein interacting with the AWS provisioning service to update the root AWS stack comprises:
  running a change set command of type import specifying the temporary root AWS template; and
  specifying a mapping of a logical resource identifier for the nested stack resource to a stack identifier for the nested AWS stack referenced in the nested stack resource.

16. The method of claim 10 further comprising:
interacting with the AWS provisioning service to create the root AWS stack in the AWS environment as an empty stack when the root AWS stack does not exist in the AWS environment upon obtaining the root AWS template.

17. The method of claim 10 wherein:
the nested stack resource specifies a stack name property that indicates a stack name that is mapped to a stack identifier specified by the AWS provisioning service when the nested AWS stack was created in the AWS environment; and
the method further comprises:
  removing the stack name property from the root AWS template; and
  interacting with the AWS provisioning service to update the root AWS stack in the AWS environment based on the root AWS template.

18. A non-transitory computer readable medium embodying programmed instructions executed by a processor, wherein the instructions direct the processor to implement a method comprising:
  communicating with an Amazon Web Services (AWS) provisioning service in an AWS environment over a network connection, the AWS environment comprising a pool of AWS resources;
  wherein the AWS provisioning service comprises an infrastructure automation service that automates deployment of the AWS resources by building AWS stacks described in AWS templates;
  wherein an AWS template describes the AWS resources of the pool that a user wants to provision in the AWS environment;
  wherein an AWS stack comprises a collection of the AWS resources described in an associated AWS template and provisioned in the AWS environment, which is managed as a single unit;
  wherein the method further comprises performing an automated process of importing an existing AWS stack existing in the AWS environment as a nested AWS stack into a root AWS stack by:

obtaining a root AWS template that describes the AWS resources to automatically provision for the root AWS stack in the AWS environment via the AWS provisioning service;

identifying the nested AWS stack referenced by a nested stack resource in a resources section of the root AWS template, wherein the nested stack resource is a type of resource that creates the nested AWS stack within another AWS stack;

interacting with the AWS provisioning service to update the nested AWS stack to preclude default values assigned to parameters of the nested AWS stack; and interacting with the AWS provisioning service to import the nested AWS stack within the root AWS stack in the AWS environment.

19. The computer readable medium of claim 18 wherein interacting with the AWS provisioning service to update the nested AWS stack comprises:

retrieving a nested stack AWS template for the nested AWS stack referenced in the root AWS template;

modifying the nested stack AWS template to remove a default property from each of one or more parameters that declare the default property;

modifying the nested stack AWS template to include a benign change that induces the AWS provisioning service to create a change set for the nested AWS stack; and interacting with the AWS provisioning service to update the nested AWS stack in the AWS environment based on a modified nested stack AWS template.

20. The computer readable medium of claim 18 wherein interacting with the AWS provisioning service to import the nested AWS stack within the root AWS stack comprises:

generating a temporary root AWS template for the root AWS stack, wherein the temporary root AWS template specifies the nested stack resource that references the nested AWS stack, a list of parameters associated with the nested stack resource, and a list of tags associated with the nested stack resource; and interacting with the AWS provisioning service to update the root AWS stack in the AWS environment based on the temporary root AWS template.

* * * * *